(12) United States Patent
Brautigam (10) Patent No.: US 8,915,230 B2
(45) Date of Patent: Dec. 23, 2014

(54) SPLIT BEARING ARRANGEMENT AND A METHOD OF MANUFACTURING A SPLIT BEARING ARRANGEMENT

(71) Applicant: Volvo Car Corporation, Goeteborg (SE)

(72) Inventor: Mattias Brautigam, Kungsbacka (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/707,036

(22) Filed: Dec. 6, 2012

(65) Prior Publication Data
US 2013/0146018 A1    Jun. 13, 2013

(30) Foreign Application Priority Data
Dec. 7, 2011 (EP) .................................. 11192426

(51) Int. Cl.
F02B 75/22      (2006.01)
F02B 77/00      (2006.01)
B23P 15/00      (2006.01)
F16C 9/02       (2006.01)
F02F 7/00       (2006.01)

(52) U.S. Cl.
CPC ............... F02B 77/00 (2013.01); B23P 15/003 (2013.01); F16C 9/02 (2013.01); F02F 2007/0056 (2013.01)
USPC ...................... 123/195 R; 29/888.01; 384/434

(58) Field of Classification Search
CPC ........... B21K 3/00; F02B 77/00; F02B 39/00; F02F 7/00; F02F 1/00; F02F 1/102; F02F 3/003; F02F 7/0046
USPC ............... 123/195 R, 195 H; 29/898, 888.01; 384/434, 294, 429, 430, 432, 433
See application file for complete search history.

(56) References Cited

U.S. PATENT DOCUMENTS 3,285,680 A * 11/1966 Dailey ........................... 428/554
3,520,045 A *  7/1970 Kuhn ............................. 29/256
4,037,888 A *  7/1977 Mirjanic ........................ 384/434
5,722,036 A *  2/1998 Shikata et al. ................ 419/38

(Continued)

FOREIGN PATENT DOCUMENTS

| DE | 19535497 A1 | 3/1997 |
| DE | 19819080 A1 | 11/1999 |
| EP | 1075605 A1 | 2/2001 |
| WO | 2010022420 A1 | 3/2010 |

OTHER PUBLICATIONS

Extended European Search Report Dated Apr. 26, 2012, Applicant Volvo Car Corporation, Application No. 11192426.2-2424, 5 Pages.

Primary Examiner — Noah Kamen
(74) Attorney, Agent, or Firm — Brooks Kushman P.C.

(57) ABSTRACT

A split bearing arrangement for reciprocating engines comprises a bedplate section and a block section made of materials differing in hardness. The bedplate section includes at least a bedplate section clamping surface made of an iron material, and has at least one positioning protrusion located on the bedplate section clamping surface. The block section, made of a material having a hardness which is less than the hardness of the iron material, is adapted to be clampable and forcibly pressed against the bedplate section. When the bedplate section is first pressed into the block section, at least one positioning groove located in a block section clamping surface is formed. The at least one positioning protrusion has two longitudinal concave surfaces, two transverse concave surfaces and a substantially flat upper surface.

22 Claims, 5 Drawing Sheets

(56) References Cited

U.S. PATENT DOCUMENTS

| | | | |
|---|---|---|---|
| 6,431,759 B1 * | 8/2002 | Luchner et al. | 384/434 |
| 6,435,723 B1 * | 8/2002 | Wolf et al. | 384/434 |
| 7,322,750 B1 * | 1/2008 | Besselman | 384/432 |
| 7,703,431 B2 * | 4/2010 | Genter | 123/197.3 |
| 2004/0022645 A1 * | 2/2004 | Rousset | 417/269 |
| 2011/0158569 A1 * | 6/2011 | Dickinger et al. | 384/434 |

* cited by examiner

SPLIT BEARING ARRANGEMENT AND A METHOD OF MANUFACTURING A SPLIT BEARING ARRANGEMENT

CROSS-REFERENCE TO RELATED APPLICATIONS

This application claims foreign priority benefits under 35 U.S.C. §119(a)-(d) to European patent application number EP 11192426.2, filed Dec. 7, 2011, which is incorporated by reference in its entirety.

TECHNICAL FIELD

The disclosure relates to a split bearing arrangement for reciprocating engines, such as for example internal combustion engines, and to a method of manufacturing the split bearing arrangement.

BACKGROUND

A known split bearing arrangement comprises an engine block and an engine bedplate which are pressed together into a connected and attached split bearing arrangement. In said known bearing arrangement, dowel holes are drilled in the engine bedplate and in the engine block, whereby steel pins are pressed into these holes for guiding and aligning the engine bedplate and the engine block to each other when the engine bedplate and the engine block are pressed and attached together. This solution involves multiple dowel holes and comprises multiple steel pins. Thus, this solution provides both a time consuming manufacturing and an expensive split bearing arrangement. Further, this solution is restricted to use relatively high mounting forces when disassembling and reassembling the engine block and the engine bedplate, whereby damages to the dowel holes, the steel pins, the engine bedplate and the engine block may occur. This provides an increased friction within the split bearing arrangement when reassembling the engine bedplate and the engine block after a first pressing and disassembling. This friction within the split bearing arrangement is specifically the crank bore friction provided due to a relatively inaccurate repositioning of the engine bedplate to the engine block after a first pressing and disassembling.

EP1075605 shows a solution for a split bearing arrangement comprising a bearing block and a bearing cover providing a material anchoring which is intended to be able to absorb high transverse loads in the split bearing arrangement. The bearing cover is made of an iron material and is clampably arranged relative to the bearing block and has sharp-edged pointed projections which protrude above a clamping surface of the bearing cover and which, in an initial mounting of the bearing cover with a particular required force, is capable of being pressed into an opposite clamping surface of the bearing block which is made of a light metal, wherein grooves are provided in the clamping surface of the bearing cover, and wherein these grooves are located in the clamping surface of the bearing cover to receive material of the bearing block that is displaced when the projections of the bearing cover are pressed into the bearing block. This solution leads to a relatively short manufacturing tool lifetime since it involves time consuming drilling operations in the cast iron and since it involves manufacturing of multiple sharp-edged pointed projections which are located across through-holes for screws in the bearing cover. This type of split bearing arrangement provides a heavy and bulky construction. When disassembling and reassembling the bearing block and the bearing cover, damages may occur. It is especially an imminent risk of damages occurring to the bearing block after the first pressing and disassembling. This since the bearing block is made of light metal and since displaced material after the first pressing is pressed out from the clamping surface of the bearing block and may be damaged. Furthermore some material may be displaced within the through-holes after the first pressing which may cause problems when reassembling the bearing block and the bearing cover using the through-holes for screws. This will provide an increased friction within the split bearing arrangement when reassembling the bearing block and the bearing cover after the first pressing and disassembling. Several manufacturing tools and manufacturing process steps are needed to manufacture the sharp-edged pointed projections for this split bearing arrangement. Further, this present example is restricted to a relatively time consuming and expensive assembly, installation, and maintenance.

Further, these known examples lack robustness and accuracy regarding the reassembly of the engine bedplate and the engine block after the first pressing, and mainly these known examples lack robustness and accuracy for the second, third, fourth and all future disassemblies and reassemblies of the engine bedplate and the engine block. This since the engine bedplate and the engine block will not be accurately positioned and guided back to the original first position from the first pressing due to material damages and/or poor guiding.

These known examples involves a relatively imminent risk for dirt being provided in the split bearing arrangement which also increases the friction within the split bearing arrangement and decreases the efficiency and capacity of the reciprocating engine.

SUMMARY

There is thus a need for an improved split bearing arrangement with improved material anchoring which also provides an improved guiding and positioning of the split bearing arrangement removing the above mentioned disadvantages.

Further, there is also a need for an improved method of manufacturing of the split bearing arrangement removing the above mentioned disadvantages.

The present disclosure relates to the field of split bearing arrangements for reciprocating engines. The split bearing arrangement is located in an engine assembly.

The present disclosure provides an inventive split bearing arrangement, which improves the accuracy when reassembling the split bearing arrangement after the first pressing and disassembling, whereby friction within the split bearing arrangement is relatively low. It is desirable to reduce friction within the crank bore of the split bearing arrangement.

An object of the present disclosure is to suggest an improved split bearing arrangement with improved guiding and positioning of an engine bedplate and an engine block after the first pressing and disassembling of the engine block and the engine bedplate, and an easy to implement method of manufacturing the split bearing arrangement improving the accuracy when both manufacturing the split bearing arrangement and the accuracy when reassembling the split bearing arrangement after the first pressing and disassembling of the engine block and the engine bedplate. The engine block comprises several block sections and the engine bedplate comprises several bedplate sections.

The present disclosure is defined by the appended independent claims. Various examples of the disclosure are set forth by the appended dependent claims as well as by the following description and the accompanying drawings.

With the above description in mind, then, an aspect of the present disclosure is to provide an improved solution of improving the handling, anchoring and positioning of an engine bedplate section and an engine block section of the split bearing arrangement which seeks to mitigate, alleviate, or eliminate one or more of the above-identified deficiencies in the art and disadvantages singly or in any combination.

According to one aspect of the present disclosure, a split bearing arrangement for reciprocating engines comprises a bedplate section and a block section made of materials differing in hardness; the bedplate section, where at least a bedplate section clamping surface is made of an iron material, is adapted to be clampable against the block section, the bedplate section has at least one positioning protrusion located on the bedplate section clamping surface; the block section, made of a material having a hardness which is less than the hardness of the iron material of the bedplate section clamping surface, is adapted to be clampable and forcibly pressed against the bedplate section, when the bedplate section is first pressed into the block section at least one positioning groove located in a block section clamping surface is formed; characterized in that the at least one positioning protrusion has two longitudinal concave surfaces, two transverse concave surfaces and a substantially flat upper surface; the block section has at least one material groove located in its block section clamping surface, the material groove is connected to the positioning groove, the at least one material groove is adapted to receive material displaced from the block section when the at least one positioning protrusion of the bedplate section is forcibly pressed into the block section; the at least one positioning groove is adapted to receive the at least one positioning protrusion after the at least first pressing. No additional parts or space are required in the inventive split bearing arrangement in order to provide an improved anchoring and positioning of the split bearing arrangement after the first pressing. The shape of the positioning protrusion enables a positioning control in both longitudinal and transverse direction. The longitudinal concave surfaces and the transverse concave surfaces are shaped such that one manufacturing tools is needed when manufacturing the positioning protrusion. The bedplate section may comprise several positioning protrusions, which may be manufactured by using one manufacturing tool during one manufacturing process step. The bedplate section clamping surface is made of an iron material which is harder than the material of the block section. The block section may be made of light metal material.

According to a further advantageous aspect of the disclosure, the at least one positioning groove has a shape corresponding to the at least one positioning protrusion. The positioning groove has a flat inner surface corresponding to the shape of the flat upper surface of the positioning protrusion. The shape of the positioning protrusion and the corresponding shape of the positioning groove provide a more accurate positioning when attaching the bedplate section and the block section to each other after the first pressing. The positioning protrusion is guided into a more accurate position by the corresponding shape of the positioning groove. The shape of the positioning groove enables a positioning control in both longitudinal and transverse direction.

According to a further advantageous aspect of the disclosure, the at least one material groove is substantially perpendicular to the at least one positioning groove. The at least one material groove can be parallel to the positioning groove. Further, the split bearing arrangement may comprise several material grooves connected to one or several positioning grooves. Further, the split bearing arrangement may comprise several positioning grooves connected to one or several material grooves.

According to a further advantageous aspect of the disclosure, the at least one positioning groove is arranged in the block section clamping surface of the block section in an area where the at least one positioning protrusion of the bedplate section is pressed in.

According to a further advantageous aspect of the disclosure, the at least one positioning groove and the at least one material groove are located outside of a block section bore between the block section bore and a longitudinal edge of the block section, such that displaced material only enters the material groove and not the block section bore.

According to a further advantageous aspect of the disclosure, the block section, with its at least one positioning groove and at least one material groove, is pressed into the bedplate section, with its positioning protrusion, by means of a screwed bearing connection and/or a press tool.

According to a further advantageous aspect of the disclosure, the bedplate section clamping surface is made of nodular iron and the block section clamping surface is made of an aluminium alloy.

According to a further advantageous aspect of the disclosure, the bedplate section and the block section are guided to fit in a predetermined position by the at least one positioning protrusion and the at least one positioning groove when the at least one positioning protrusion is pressed into the positioning groove after the at least first pressing.

According to a further advantageous aspect of the disclosure, the height of the positioning protrusion above the bedplate section clamping surface is less than 2 mm, preferably in the range of 0.2 to 1.6 mm, more preferably in the range of 0.4 to 1.1 mm, even more preferably in the range of 0.6 to 0.9 mm.

According to a further advantageous aspect of the disclosure, the thickness of the positioning protrusion is less than 2 mm, preferably in the range of 0.2 to 1.6 mm, more preferably in the range of 0.4 to 1.1 mm, even more preferably in the range of 0.6 to 0.9 mm.

According to a further advantageous aspect of the disclosure, the width of the positioning protrusion is less than 20 mm, preferably in the range of 5 to 15 mm, more preferably in the range of 8 to 13 mm.

According to a further advantageous aspect of the disclosure, a first radius of the positioning protrusion is greater than 0.5 mm, preferably in the range of 0.8 to 3 mm, more preferably in the range of 1 to 2 mm. According to a further advantageous aspect of the disclosure, a second radius of the positioning protrusion is greater than 0.5 mm, preferably in the range of 0.8 to 3 mm, more preferably in the range of 1 to 2 mm. The positioning protrusion can comprise a first radius for the two longitudinal surfaces and an equal second radius for the two transverse surfaces. Further, the positioning protrusion can comprise a first radius for the two longitudinal surfaces and a different second radius for the two transverse surfaces. Both the first and second radius of the longitudinal concave surfaces and the transverse concave surfaces are adapted such that that one manufacturing tool and process is needed when manufacturing positioning protrusions according to the disclosure.

According to a further advantageous aspect of the disclosure, the at least one positioning protrusion on the bedplate section is formed by means of cutting and/or erosion. The positioning protrusion has a shape which enables it to be formed by means of one manufacturing tool for cutting or erosion. All the positioning protrusions of the engine bedplate can be manufactured during one manufacturing session and by using one manufacturing tool. This improves the workflow of the manufacturing compared to using several manufacturing tools.

The object is further achieved by a method of manufacturing a split bearing arrangement for a reciprocating engine comprising: providing a bedplate section, where the bedplate section comprises at least a bedplate section clamping surface made of an iron material, the bedplate section being adapted to be clampable against a block section, the bedplate section comprising at least one positioning protrusion located on the bedplate section clamping surface, the at least one positioning protrusion has two longitudinal concave surfaces, two transverse concave surfaces and an substantially flat upper surface, the at least one positioning protrusion being formed by means of cutting and/or erosion; providing the block section differing in hardness from the bedplate section, the block section comprises a block section clamping surface, the block section being made of a material having a hardness which is less than the hardness of the iron material of the bedplate section clamping surface and being adapted to be clampable and forcibly pressed against the bedplate section, the block section comprising at least one material groove located in its block section clamping surface, forming at least one positioning groove located in the block section clamping surface when the at least one positioning protrusion of the bedplate section is forcibly pressed into the block section, the positioning groove being connected to the material groove, the material groove receiving material of the positioning groove of the block section, the material being displaced when the at least one positioning protrusion of the bedplate section is forcibly pressed into the block section clamping surface of the block, the at least one positioning groove being adapted to receive the at least one positioning protrusion after at least a first pressing. By manufacturing the split bearing arrangement according to the disclosure, the manufacturing workload can be reduced and tool lifetime can be increased. The positioning protrusion can be manufactured using one manufacturing tool during one manufacturing process step.

According to a further advantageous aspect of the disclosure, a vehicle comprises an engine assembly comprising a split bearing arrangement according to the disclosure.

Any of the advantageous features of the present disclosure above may be combined in any suitable way.

A number of advantages are provided by means of the present disclosure, for example:

a solution which improves the guiding and positioning when matching and fitting the bedplate section and the block section to each other after the first pressing is obtained;

an improved, accurate and more robust split bearing arrangement is obtained providing reduced friction within the split bearing arrangement and reduced fuel consumption.

a solution which reduces the risk for cold start of the engine is obtained;

a solution which reduces the risk for damaging the bedplate section or the block section of the split bearing arrangement is obtained;

a solution which allows for a reduction of the amount of drilling holes needed in the split bearing arrangement is obtained, this since the material groove may be used for both displaced material after the first pressing and for transporting oil within the engine;

an improved workflow during manufacturing, enabling a longer lifetime for manufacturing tools, of a split bearing arrangement is obtained;

a more cost efficient and robust manufacturing process of the split bearing arrangement is obtained.

BRIEF DESCRIPTION OF THE DRAWINGS

Examples according to the present disclosure will now be described in detail with reference to the attached figures, wherein.

It should be added that the following description of the examples is for illustration purposes only and should not be interpreted as limiting the disclosure exclusively to these examples/aspects.

DETAILED DESCRIPTION

All the FIGS. 1 to 6 are schematically illustrated.

The following examples according to the present disclosure relate, in general, to the field of engine assemblies and main bearings caps in engines, in particularly, to a solution for a split bearing arrangement for a reciprocating engine, wherein the split bearing arrangement comprises a block section and a bedplate section having a positioning protrusion.

The present disclosure provides a solution for an inventive split bearing arrangement with improved guiding and positioning of an engine bedplate and an engine block in an engine assembly.

Examples according to the present disclosure will be described more fully hereinafter with reference to the accompanying drawings. The invention may, however, be embodied in many different forms and should not be construed as limited to the examples set forth herein. Rather, these examples are provided so that this disclosure will be thorough and complete, and will fully convey the scope of the invention to those skilled in the art. Like reference signs refer to like elements throughout.

Figure 1:
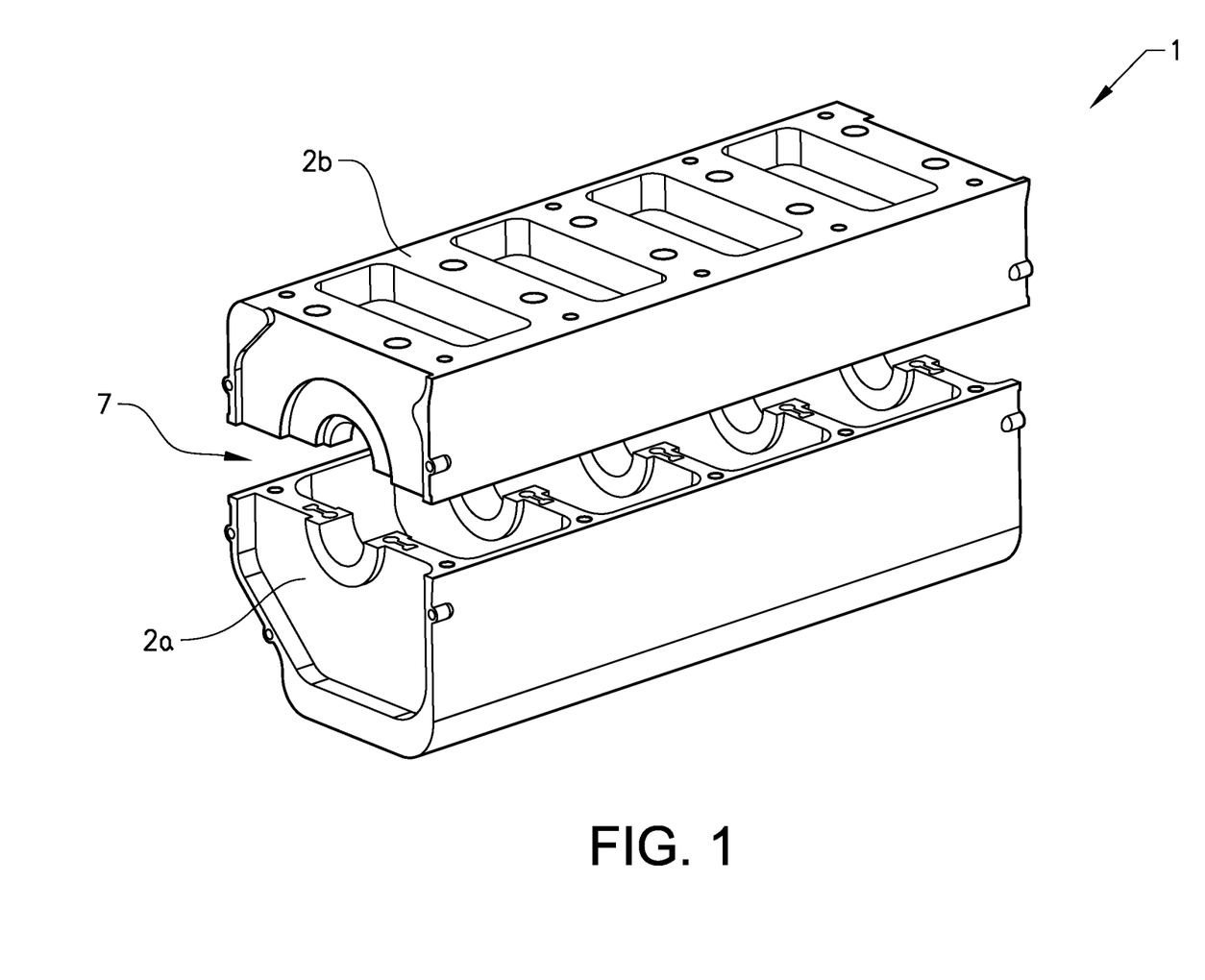
FIG. 1 shows a schematically illustration of an engine assembly comprising split bearing arrangements according to the disclosure.

FIG. 1 schematically shows an engine assembly 1 comprising split bearing arrangements 7 according to the present disclosure. The engine assembly in FIG. 1 comprises five split bearing arrangements 7 and is a four-cylinder engine assembly. However, the engine assembly may comprise less than five or more than five split bearing arrangements 7. The number of split bearing arrangements 7 depends on the type of engine. The engine assembly comprises an engine block 2a and an engine bedplate 2b. The engine bedplate 2b comprises several main bearing caps composing a main bearing bridge, but it could just as well be a singular main bearing cap. As can be seen in FIG. 1, the engine block 2a and the engine bedplate 2b are adapted to be fitted and attached together in an engine assembly 1. The engine block 2a is made of an aluminum alloy. The engine bedplate 2b is made of aluminum alloy with incast iron alloy cores. The engine bedplate 2b is adapted to be attached to the engine block 2a by means of bolts or screws in bores.

Figure 2:
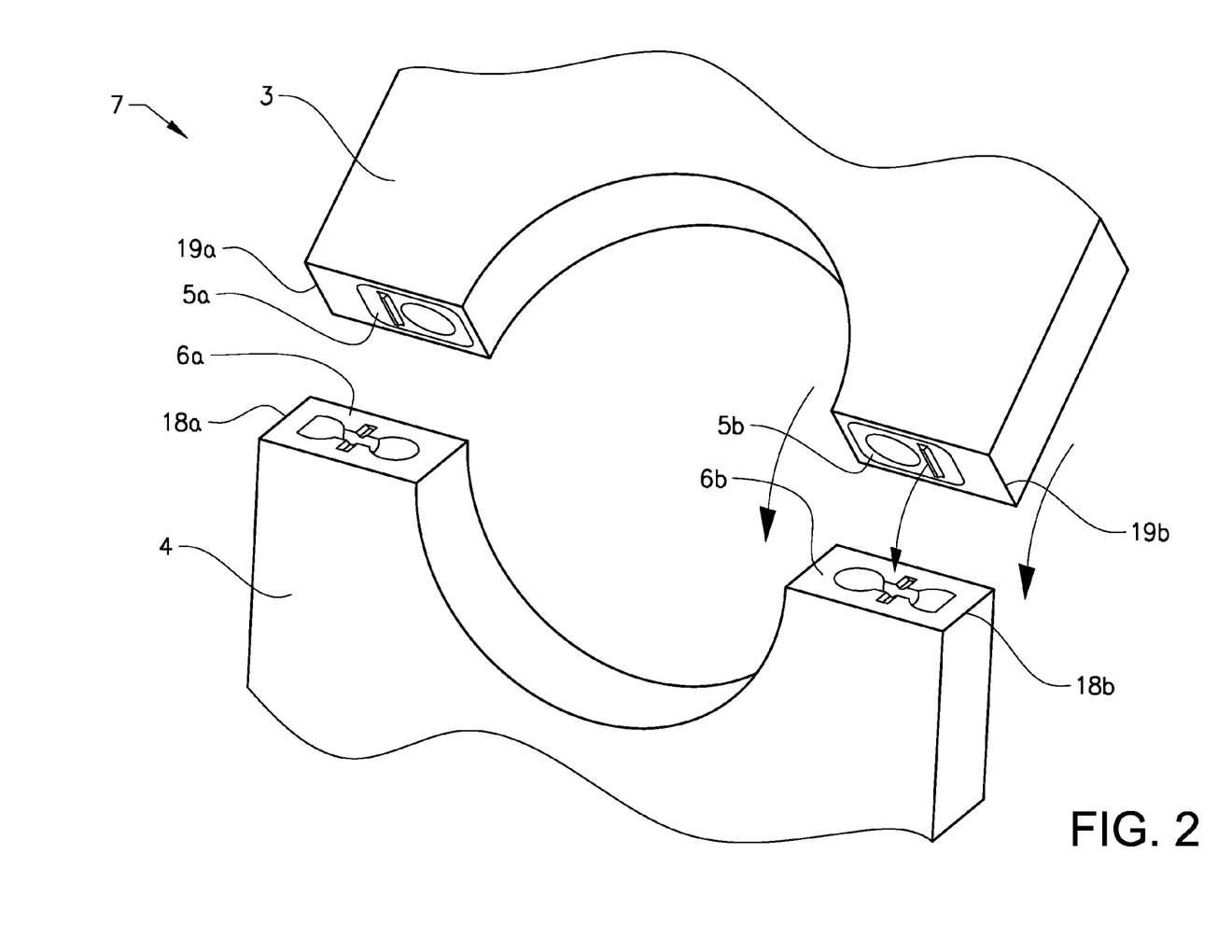
FIG. 2 shows a schematically illustration of a split bearing arrangement according to the disclosure.

FIG. 2 schematically shows a split bearing arrangement 7 according to the present disclosure. The split bearing arrangement 7 comprises a bedplate section 3 and a block section 4. The bedplate section 3 has two bedplate section bores and the block section 4 has two corresponding block section bores.

The bedplate section 3 and the block section 4 are made of materials differing in hardness. The bedplate section 3 comprises a material which is harder than the material of the block section 4. The bedplate section 3 comprises a first bedplate section clamping surfaces 5a and a second bedplate section clamping surfaces 5b made of an iron material, such as for example nodular iron or gray cast iron or steel. The first and second bedplate section clamping surfaces 5a, 5b are the visible part of the incast iron alloy core. The block section 4 comprises first and second block section clamping surfaces 6a, 6b made of an aluminum alloy. The bedplate section 3 has one positioning protrusion located on the first bedplate section clamping surface 5a and one positioning protrusion located on the second bedplate section clamping surface 5b. The first and second bedplate section clamping surfaces 5a, 5b and the first and second block section clamping surfaces 6a, 6b are adapted to be clampable and pressed against each other. The bedplate section 3 and its two positioning protrusions is adapted to be forcibly pressed into the block section 4 and its first and second block section clamping surfaces 6a, 6b, whereby one positioning groove located in the first block section clamping surface 6a is formed and one positioning groove located in the second block section clamping surface 6b is formed. The block section 4 has a first longitudinal edge 18a and a second longitudinal edge 18b. The bedplate section 3 has a first longitudinal edge 19a and a second longitudinal edge 19b.

Figure 3A:
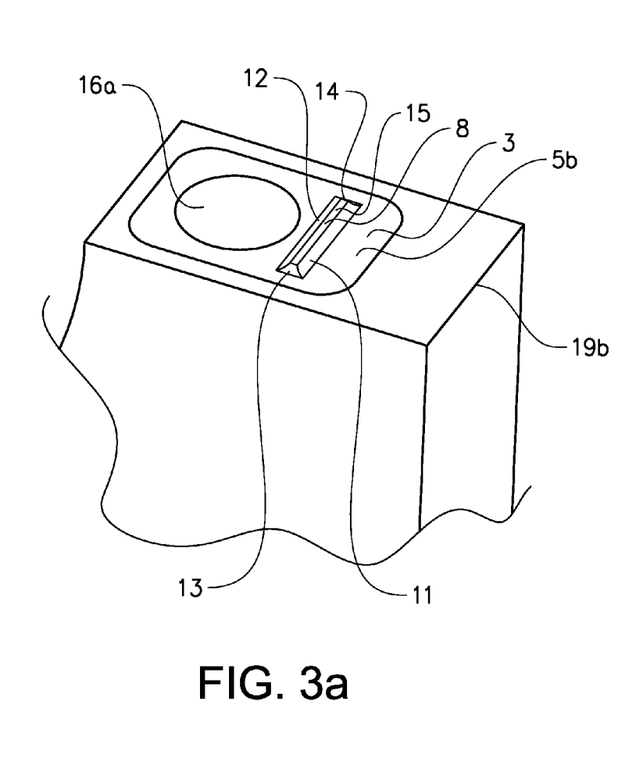
FIG. 3a shows a schematically illustration of a part of a bedplate section according to the disclosure.

FIG. 3a schematically shows a part of a bedplate section 3 comprising a positioning protrusion 8 according to the disclosure. The positioning protrusion 8 has a first longitudinal concave surface 11, a second longitudinal surface 12, a first transverse concave surface 13, a second transverse concave surface 14 and a substantially flat upper surface 15. The radius of the two concave longitudinal surfaces 11, 12 and the two transverse concave surfaces 13, 14 can be either equal or different. The positioning protrusion 8 can comprise a first radius for the two longitudinal concave surfaces 11, 12 and an equal second radius for the two transverse concave surfaces 13, 14. The positioning protrusion 8 can comprise a first radius for the two longitudinal concave surfaces 11, 12 and a different second radius for the two transverse concave surfaces 13, 14. The bedplate section 3 comprises a bedplate section bore 16a for bolts or screws. This bedplate section bore 16a is used when pressing and attaching the bedplate section 3 to the block section. The positioning protrusion 8 shown in FIG. 3a is located between the bedplate section bore 16a and the second longitudinal edge 19b.

Figure 3B:
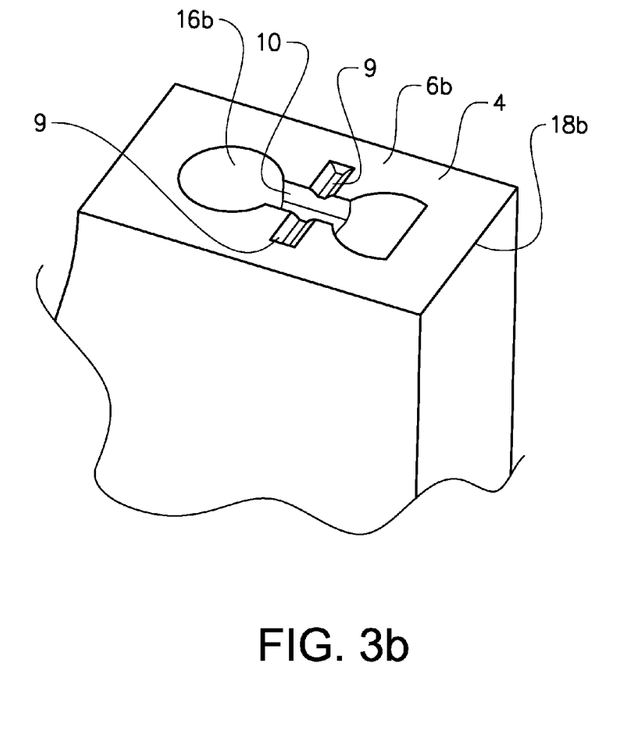
FIG. 3b shows a schematically illustration of a part of a block section according to the disclosure.

FIG. 3b schematically shows a part of a block section 4 according to the disclosure. The block section 4 has a material groove 10 located in its second block section clamping surface 6b. When the positioning protrusion 8 is first forcibly pressed into the second block section clamping surface 6b a positioning groove 9 located in the second block section clamping surface 6b is formed. The material groove 10 is formed such that it can receive material displaced from the block section 4 during pressing of the positioning protrusion into the block section 4. The material groove 10 is connected with the positioning groove 9. The material groove 10 is substantially perpendicular to the positioning groove 9. The material groove 10 may also function as a transport channel for oil. The block section 4 comprises a block section bore 16b for bolts or screws. This block section bore 16b is used when pressing and attaching the bedplate section 3 to the block section 4. The bedplate section bore 16a and the block section bore 16b are arranged to match each other. As can be seen in FIG. 3b, the positioning groove 9 is located outside of the block section bore 16b between the block section bore 16b and the second longitudinal edge 18b of the block section 4. The positioning groove 9 and the material groove 10 are arranged such that displaced material only enters the material groove 10 and not the block section bore 16b.

Figure 4:
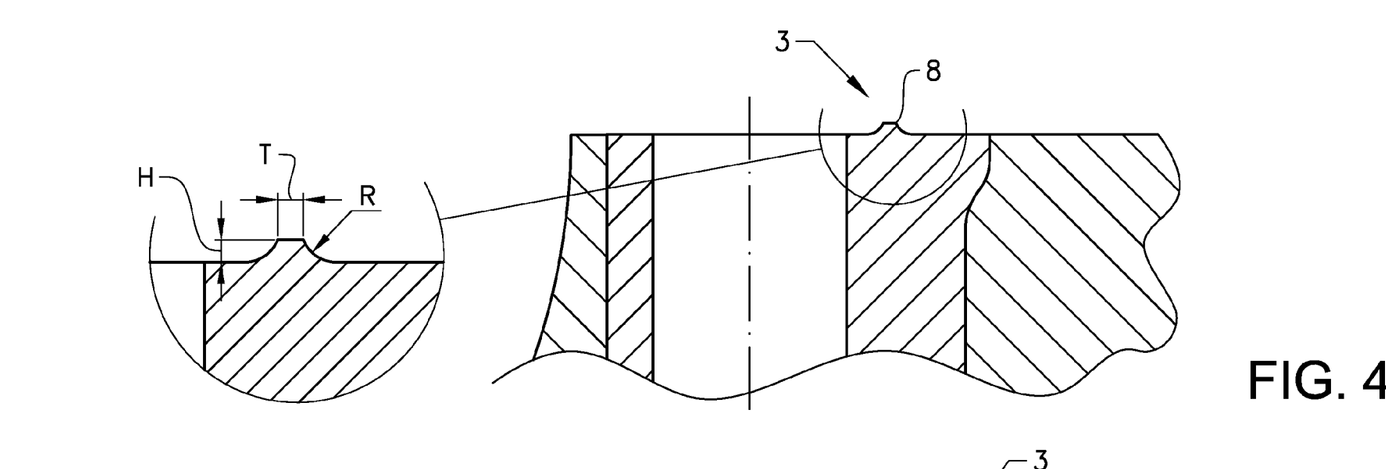
FIG. 4 shows a schematically cross-section view illustration of a positioning protrusion of a bedplate section according to the disclosure.

FIG. 4 schematically shows a cross-section view of a positioning protrusion 8 of a bedplate section 3 according to the disclosure. In the example shown in FIG. 4 the positioning protrusion 8 has a radius (R) which is equal for the two longitudinal concave surfaces and the transverse concave surfaces. The substantially flat upper surface of the positioning protrusion 8 has a thickness (T) which enables an accurate positioning control in both longitudinal direction and transverse direction. The thickness (T) equals the thickness of the upper flat surface of the positioning protrusion 8. The positioning protrusion 8 has a height (H) above the bedplate section clamping surface.

Figure 5:
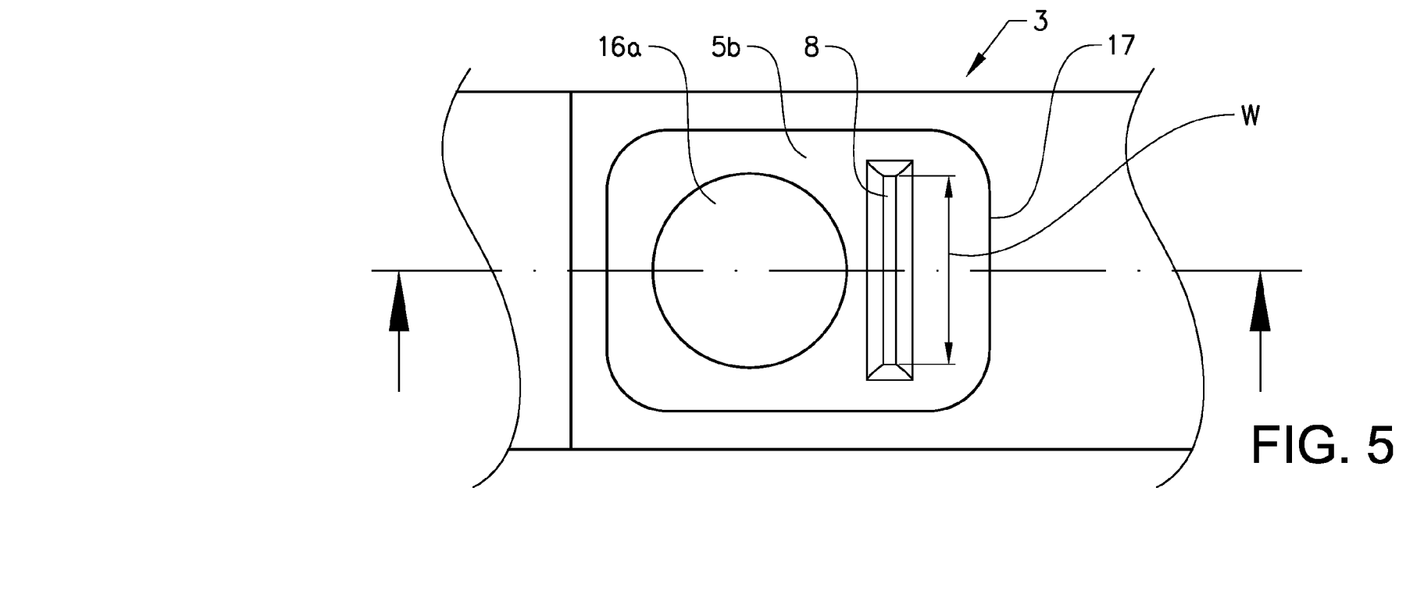
FIG. 5 shows a schematically top-view illustration of a positioning protrusion of a bedplate section according to the disclosure.

FIG. 5 schematically shows a top-view of a positioning protrusion 8 of a bedplate section 3 according to the disclosure. The positioning protrusion 8 has a width (W). The width (W) equals the width of the upper flat surface of the positioning protrusion 8. The positioning protrusion 8 is located outside of the bedplate section bore 16a between the bedplate section bore 16a and a longitudinal edge 17 of the second bedplate section clamping surface 5b, and the block section has a corresponding block section bore.

Figure 6:
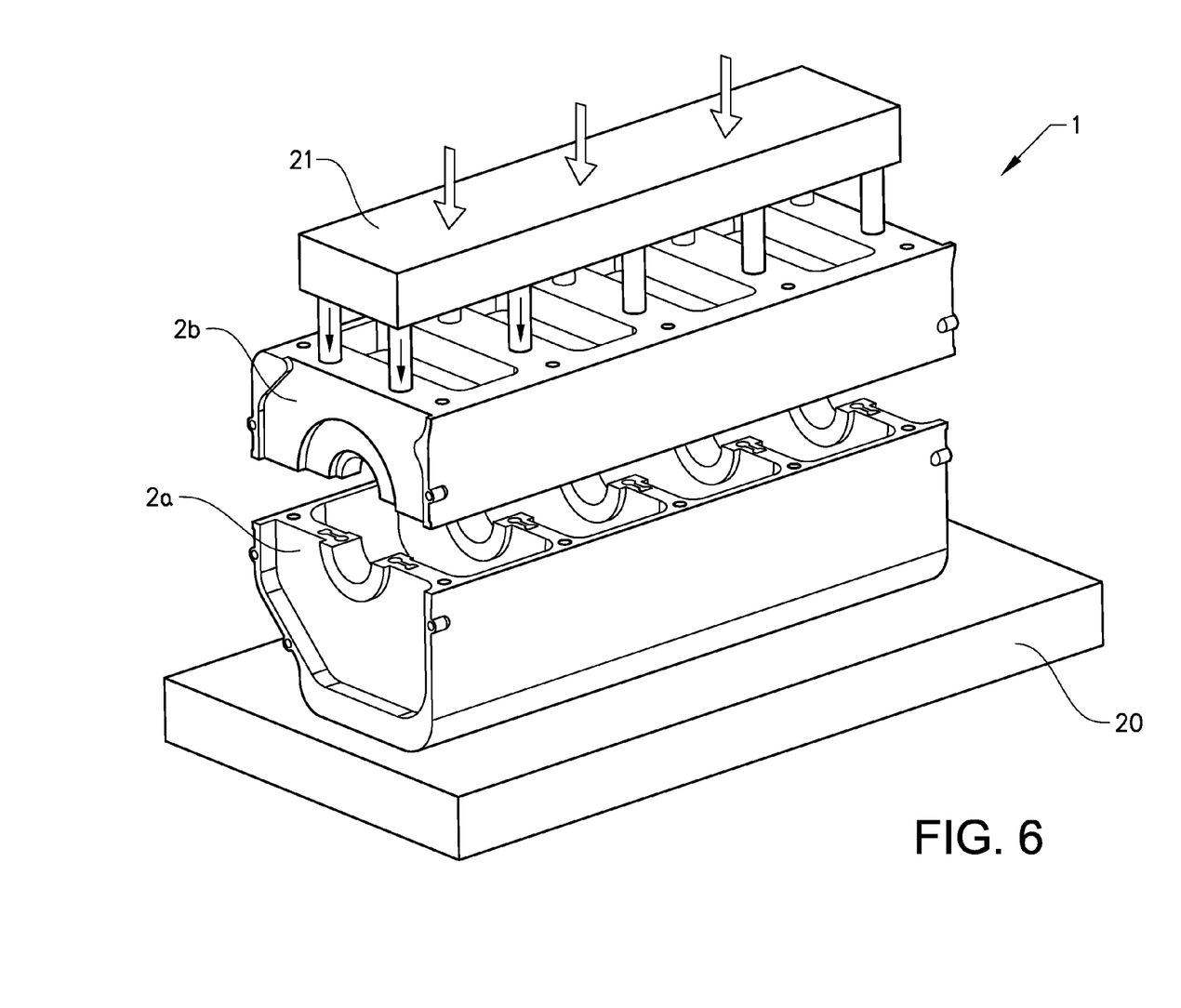
FIG. 6 shows a schematically illustration of an press tool for pressing an engine bedplate to an engine block according to the disclosure.

FIG. 6 schematically shows a press tool 20 for pressing the engine bedplate 2b to the engine block 2a according to the disclosure, wherein in the engine block 2a is positioned on a support plate 21. The pressing of the engine bedplate 2b to the engine block 2a is done by using conventional and known methods.

The split bearing arrangement according to the disclosure may be used for any type of appropriate reciprocating engine in any type of appropriate vehicle in the form of, for example, a car, a truck, bus or a motorcycle.

The disclosure is not limited to the example described above, but may be modified without departing from the scope of the claims below.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present disclosure. However, the disclosure should be regarded as illustrative rather than restrictive, and not as being limited to the particular examples discussed above. The different features of the various examples of the disclosure can be combined in other combinations than those explicitly described. It should therefore be appreciated that variations may be made in those examples by those skilled in the art without departing from the scope of the present disclosure as defined by the following claims.

What is claimed is:

1. A split bearing arrangement for reciprocating engines, the split bearing arrangement comprising:
    a bedplate section and a block section made of materials differing in hardness;
    the bedplate section, which includes at least a bedplate section clamping surface made of an iron material, being adapted to be clampable against the block section, the bedplate section having at least one positioning protrusion located on the bedplate section clamping surface, the at least one positioning protrusion having two longitudinal concave surfaces, two transverse concave surfaces and a substantially flat upper surface;
    the block section being made of a material having a hardness which is less than the hardness of the iron material of the bedplate section clamping surface, and the block section being adapted to be clampable and forcibly pressed against the bedplate section, wherein the block section includes a block section clamping surface in which at least one positioning groove is formable when the bedplate section is first pressed into the block section, the block section further having at least one material groove located in the block section clamping surface, the at least one material groove being adapted to receive material displaced from the block section when the at least one positioning protrusion of the bedplate section is forcibly pressed into the block section, and the at least one material groove being configured to be connected to the at least one positioning groove upon formation of the at least one positioning groove;
    wherein the bedplate section is configured to form the at least one positioning groove such that the at least one positioning groove is adapted to receive the at least one positioning protrusion after the first pressing.

2. The split bearing arrangement according to claim 1 wherein the at least one positioning protrusion is configured to form the at least one positioning groove such that the at least one positioning groove has a shape corresponding to the at least one positioning protrusion.

3. The split bearing arrangement according to claim 1 wherein the at least one material groove is configured to be substantially perpendicular to the at least one positioning groove upon formation of the at least one positioning groove.

4. The split bearing arrangement according to claim 1 wherein the bedplate section is configured to form the at least one positioning groove in the block section clamping surface of the block section in an area in which the at least one positioning protrusion of the bedplate section is pressable.

5. The split bearing arrangement according to claim 1 wherein the block section has a block section bore and a longitudinal edge, and wherein the bedplate section is configured to form the at least one positioning groove such that the at least one positioning groove and the at least one material groove are located between the block section bore and the longitudinal edge of the block section.

6. The split bearing arrangement according to claim 1 wherein the block section is configured to be pressed into the bedplate section by means of a screwed bearing connection and/or a press tool.

7. The split bearing arrangement according to claim 1 wherein the bedplate section clamping surface is made of nodular iron and the block section clamping surface is made of an aluminum alloy.

8. The split bearing arrangement according to claim 1 wherein the bedplate section is configured to form the at least one positioning groove such that the at least one positioning groove is cooperable with the at least one positioning protrusion to guide the bedplate section and the block section to fit in a predetermined position when the at least one positioning protrusion is pressed into positioning groove after the first pressing.

9. The split bearing arrangement according to claim 1 wherein the at least one positioning protrusion has a height (H) above the bedplate section clamping surface that is less than 2 mm.

10. The split bearing arrangement according to claim 1 wherein the at least one positioning protrusion has a thickness (T) that is less than 2 mm.

11. The split bearing arrangement according to claim 1 wherein the at least one positioning protrusion has a width (W) that is less than 20 mm.

12. The split bearing arrangement according to claim 1 wherein at least one of the two longitudinal concave surfaces of the at least one positioning protrusion has a first radius (R) that is greater than 0.5 mm.

13. The split bearing arrangement according to claim 1 wherein at least one of the two transverse concave surfaces of the at least one positioning protrusion has a second radius (R) that is greater than 0.5 mm.

14. The split bearing arrangement according to claim 1 wherein the at least one positioning protrusion on the bedplate section is formed by means of cutting and/or erosion.

15. The split bearing arrangement according to claim 1 wherein the block section has a block section bore and a longitudinal edge, and wherein the bedplate section is configured to form the positioning groove such that the positioning groove and the material groove are located between the block section bore and the longitudinal edge of the block section.

16. The split bearing arrangement according to claim 1 wherein the bedplate section has first and second longitudinal edges and first and second lateral edges, and wherein each of the at least one positioning protrusion is spaced away from the longitudinal edges and the lateral edges.

17. The split bearing arrangement according to claim 1 wherein the bedplate section clamping surface has a flat portion, and each of the at least one positioning protrusion extends outwardly from the flat portion such that for each of the at least one positioning protrusion, the two longitudinal concave surfaces and the two transverse concave surfaces extend outwardly of the flat portion.

18. A method of manufacturing a split bearing arrangement for a reciprocating engine, the method comprising:
    forcibly pressing at least one positioning protrusion, located on a bedplate section clamping surface of a bedplate section, into a block section to form at least one positioning groove in a block section clamping surface of the block section such that the at least one positioning groove is connected to at least one material groove located in the block section clamping surface, and such that the at least one positioning groove is configured to receive the at least one positioning protrusion after being formed, wherein at least the bedplate section clamping surface of the bedplate section is made of an iron material, the bedplate section is adapted to be clampable against the block section, and each of the at least one positioning protrusion has two longitudinal concave surfaces, two transverse concave surfaces and an substantially flat upper surface, and wherein the block section is made of a material having a hardness that is less than the hardness of the iron material of the bedplate section clamping surface, and the at least one material groove is configured to receive material that is displaced when the at least one positioning protrusion of the bedplate section is forcibly pressed into the block section clamping surface of the block.

19. The method of claim 18 wherein the at least one positioning protrusion is formed by cutting and/or erosion.

20. A split bearing arrangement for reciprocating engines, the split bearing arrangement comprising:
   a bedplate section and a block section made of materials differing in hardness;
   the bedplate section, which includes at least a bedplate section clamping surface made of an iron material, being adapted to be clampable against the block section, the bedplate section having a positioning protrusion located on the bedplate section clamping surface, the positioning protrusion having two longitudinal concave surfaces, two transverse concave surfaces and a substantially flat upper surface;
   the block section being made of a material having a hardness which is less than the hardness of the iron material of the bedplate section clamping surface, and the block section being adapted to be clampable and forcibly pressed against the bedplate section, wherein the block section includes a block section clamping surface in which a positioning groove is formable when the bedplate section is first pressed into the block section, the block section further having a material groove located in the block section clamping surface, the material groove being adapted to receive material displaced from the block section when the positioning protrusion of the bedplate section is forcibly pressed into the block section, and the material groove being configured to be connected to the positioning groove when formed;
   wherein the bedplate section is configured to form the positioning groove such that the positioning groove is adapted to receive the positioning protrusion after the first pressing.

21. The split bearing arrangement according to claim 20 wherein the positioning protrusion is configured to form the positioning groove such that the positioning groove has a shape corresponding to the positioning protrusion.

22. The split bearing arrangement according to claim 20 wherein the material groove is configured to be substantially perpendicular to the positioning groove upon formation of the positioning groove.

* * * * *